Patented Apr. 24, 1951

2,550,015

UNITED STATES PATENT OFFICE 2,550,015

METHOD OF PREVENTING LOSS OF IODINE FROM IODINE IN THE ELEMENTARY STATE AND ALL OF ITS COMPOUNDS

Howard C. Maffitt, Des Moines, Iowa, assignor to Iowa Limestone Company, Des Moines, Iowa No Drawing. Application November 15, 1948, Serial No. 60,171

8 Claims. (Cl. 99—2)

The principal object of this invention is to provide a method of preventing loss of iodine from iodine in the elementary state and all compounds containing iodine due to decomposition resulting from iodine oxidation and other chemical reactions taking place after mixing with other compounds.

More specifically the object of my invention is to provide a method of filming iodine in the elementary state and all compounds containing iodine with a protective coating whereby the iodine will be protected against other elementary substances, chemical compounds and other physical and chemical changes such as caused by the effect of air, light, high temperatures, low temperatures, gases, etc.

A still further object of my invention is to provide a method of preventing loss of iodine whereby the iodine in the elementary form and in all of its compounds will be protected against losses by reactions that would normally be set up within the elementary iodine and within all compounds containing iodine.

A still further object of my invention is to provide a means for preventing loss of iodine that permits the treatment of iodine in the elementary state and all compounds containing iodine to be co-mingled with other compounds, without serious loss of iodine over an extended period of time.

These and other objects will be apparent to those skilled in the art.

In general my process or method consists in surrounding minute particles of iodine in the elementary state or compounds containing iodine with a coating or film of sodium silicate (water glass).

This problem of protecting iodine in the elementary state and all compounds containing iodine against loss of iodine is not new. Iodine is an essential element for protection against common goiter or the enlargement of the thyroid glands. Usually iodine is administered to humans by the iodization of common salt. In the case of animals it is often put into the commercial dry feed or into feed supplement materials. One of the methods is to introduce potassium iodide into products used in the proper feeding of animals. However, in all cases, the iodine content rapidly disappears. This is due to the rapid oxidation of the iodine by air and the effects of heat, light, gases and any other materials with which it is admixed. I have overcome such iodine losses by a method which I will now describe. I make up a solution of potassium iodide in a sodium silicate solution. The sodium silicate solution represents silicon dioxide, sodium oxide and water. The potassium iodide furnishes the iodine content. The solution consists of the following percentages of ingredients by weight.

| | Per cent |
|---|---|
| Potassium iodide (KI) | 5 |
| Silicon dioxide ($SiO_2$) | 15 |
| Sodium oxide ($Na_2O$) | 10 |
| Water ($H_2O$) | 70 |
| Total | 100 |

The silicon dioxide, sodium oxide and part of the water form the water-glass or sodium silicate and it has been found that the solution surrounds minute particles of the iodine in the elementary state or compounds containing iodine thereby encasing them and sealing them against disintegration due to the effects of air, gases, high temperatures, low temperatures, sunlight, etc. as well as the chemicals with which they may later come in contact. Iodine in the elementary state or compounds containing iodine so treated may be introduced into salt (sodium chloride) for humans or into feed materials for animals. Considerable age before consumption will not materially reduce the iodine content. Ground or pulverized limestone, salt or other material with which it is admixed will not come into direct contact with, nor affect the particles of iodine in the elementary state or compounds containing iodine in as much as such particles are surrounded by a jacket or case of sodium silicate (water-glass). With my method of treating iodine in the elementary state or compounds containing iodine, the same may be safely co-mingled with other elementary substances, chemicals or compounds that would otherwise cause rapid loss of iodine. Furthermore, my method of treating iodine in the elementary state and all compounds containing iodine, prevents loss of iodine from them and therefore gives to them a longer life without serious chemical change. If the iodine in the elementary or any of its chemical combinations are to be co-mingled with other material, any suitable method or means may be used to uniformly get the iodine into the material. I have found that mechanical sprayers are most successful by introducing a fine mist of the treated iodide into an air-supported mass of certain base materials such as ground limestone. The base material may be placed in a state of air suspension by mechanical means, such as revolving blower type fans. As only a small part of iodide to the base material is used, the above method of mixing insures uniform dispersion of the potassium iodide throughout the entire bulk of the base material. Also the iodine will not directly contact harmful oxidation particles in the limestone, such as iron, manganese and like, due to the protective coating of the sodium silicate. However, the coated iodide sprayed particles will readily adhere to the particles of the base material. While before consumption, the iodine in the elementary state and all chemical combinations of iodine are coated and protected, I find that upon entering the stomach the sodium silicate coating is acted upon by the stomach contents and the iodine is released so that it can be assimilated by the person or animal eating it. From the foregoing, it will be seen that I have provided an economical and efficient method of preventing the loss of iodine from iodine in the elementary state and from all its compounds prior to use.

Some variations may be made in the component substances used in my process or method of preventing the loss of iodine from iodine in the elementary state and all chemical combinations of iodine without departing from the ultimate results obtained and it is my intention to cover in my claims any variations of proportions and composition which may be reasonably included within their scope.

I claim:

1. The method of preventing the loss of iodine from iodine in the elementary state and from all its applicable compounds, comprising; the surrounding of the particles of iodine in the elementary state and all its applicable compounds with water glass.

2. The method of preserving iodine from loss, comprising; the mixing of sodium silicate with potassium iodide.

3. The method of preventing the loss of iodine, comprising; the mixing of potassium iodide, silicon dioxide, sodium oxide and water.

4. The method of preventing the loss of iodine, comprising; the making of a solution of approximately five per cent by weight of potassium iodide, approximately fifteen per cent by weight of silicon dioxide, approximately ten per cent by weight of sodium oxide and approximately seventy per cent by weight of water.

5. The method of preventing the loss of iodine in the elementary state and all its applicable compounds from a base material, comprising; the surrounding of particles of iodine in the elementary state and all its applicable compounds with sodium silicate, and lastly the introduction of the surrounded particles of iodine in the elementary state into the base material.

6. The method of preventing the loss of iodine when mixed with ground limestone, comprising; the surrounding of particles of iodine with sodium silicate, and lastly the introduction of the surrounded particles of iodine into the ground limestone.

7. The method of obtaining uniform dispersion of various percentages of potassium iodide when mixed with base material or materials, comprising; the solution of potassium iodide in water (molecular subdivision) in water glass and introducing the surrounded particles in a very minute state of subdivision uniformly into the base material or materials.

8. The method of preventing the loss of iodine from iodine in any of its applicable compounds, comprising; the surrounding of particles of iodine with a jacket of water glass for preventing loss of iodine by volatilization and changes caused by materials outside of the coating or jacket.

HOWARD C. MAFFITT.

REFERENCES CITED

The following references are of record in the file of this patent:

UNITED STATES PATENTS

| Number | Name | Date |
|---|---|---|
| 28,541 | Vanderburgh | May 29, 1860 |
| 2,164,089 | Shumaker | June 27, 1939 |
| 2,276,503 | McHan | Mar. 17, 1942 |
| 2,382,193 | Whitmoyer | Aug. 14, 1945 |